(12) United States Patent
Davidson et al.

(10) Patent No.: US 8,704,131 B2
(45) Date of Patent: Apr. 22, 2014

(54) METHOD AND APPARATUS FOR PULSE WELDING

(75) Inventors: Robert R. Davidson, New London, WI (US); David G. Almy, Fremont, WI (US); Richard J. Schuh, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 2126 days.

(21) Appl. No.: 11/278,344

(22) Filed: Mar. 31, 2006

(65) Prior Publication Data

US 2007/0235434 A1 Oct. 11, 2007

(51) Int. Cl.
*B23K 9/10* (2006.01)

(52) U.S. Cl.
USPC .................................. 219/130.51; 219/130.5

(58) Field of Classification Search
USPC .......................................... 219/130.51, 130.5
See application file for complete search history.

(56) References Cited

U.S. PATENT DOCUMENTS

| | | | | |
|---|---|---|---|---|
| 4,546,234 A * | 10/1985 | Ogasawara et al. | ...... | 219/137 PS |
| 4,889,969 A * | 12/1989 | Kawai et al. | ............ | 219/130.51 |
| 5,001,326 A | 3/1991 | Stava | | |
| 5,340,963 A | 8/1994 | Bodewigs | | |
| 5,637,947 A * | 6/1997 | Kising et al. | ............ | 310/316.01 |
| 5,742,029 A | 4/1998 | Stava et al. | | |
| 6,114,655 A | 9/2000 | Reynolds | | |
| 6,329,636 B1 | 12/2001 | Geissler | | |
| 6,501,049 B2 * | 12/2002 | Stava | ...................... | 219/137 PS |
| 6,515,259 B1 * | 2/2003 | Hsu et al. | ................. | 219/130.51 |
| 6,670,579 B2 | 12/2003 | Davidson et al. | | |
| 6,700,097 B1 * | 3/2004 | Hsu et al. | ................... | 219/130.5 |
| 6,723,957 B2 | 4/2004 | Holverson et al. | | |
| 6,800,832 B2 | 10/2004 | Hutchison et al. | | |
| 6,909,067 B2 | 6/2005 | Davidson et al. | | |
| 6,974,932 B2 | 12/2005 | Holverson et al. | | |
| 7,109,439 B2 * | 9/2006 | Stava | ...................... | 219/130.51 |
| 7,173,214 B2 | 2/2007 | Nadzam et al. | | |

FOREIGN PATENT DOCUMENTS

FR 2612101 9/1988

OTHER PUBLICATIONS

Miller® Owner's Manual Pulsar 450® Apr. 1993.
Miller® Summit Arc 1000/1250 Sep. 2004.
European Patent Office (Jan. 28, 2009).
PCT International Search Report Aug. 31, 2007.

* cited by examiner

*Primary Examiner* — Henry Yuen
*Assistant Examiner* — Ayub Maye
(74) *Attorney, Agent, or Firm* — George R. Corrigan

(57) ABSTRACT

A method and system for pulse welding provides an output pulse waveform. The waveform has at least a frequency from a range of available frequencies not limited to harmonic frequencies. The waveform provides power suitable for welding, and has a plurality of background portions alternating with a plurality of peak portions. A transition down occurs from the peak portion to the background portion with a first acceleration and a transition up occurs from the background portion to the peak portion with a second acceleration. At least one of the first and second accelerations are non-zero over at least most of the transition. The waveform is preferably created by switching an inverter. Both accelerations may be non-zero, and each transition may have two accelerations, one negative closer to the peak, and one positive closer to the background. The accelerations may be constant with opposite polarity. Preferably the process is current controlled during the transitions. The process frequency may be fixed or varying.

22 Claims, 4 Drawing Sheets

METHOD AND APPARATUS FOR PULSE WELDING

FIELD OF THE INVENTION

The present invention relates generally to the art of welding and welding power supplies. More specifically, it relates to pulse welding and pulse welding power supplies.

BACKGROUND OF THE INVENTION

There are many known types of welding systems used for many different welding processes. Welding system, or system for welding, as used herein, includes one or more of a power source, controller, wire feeder, and a source of gas, it may also include peripherals such as robots etc. Welding power supply, as used herein, includes any device capable of supplying welding, plasma cutting, and/or induction heating power including power circuitry, control circuitry and other ancillary circuitry associated therewith.

One type of welding system includes a current controlled welding power source. A current controlled welding power source, as used herein, is a current controlled power source, wherein the output current is monitored, and the output is adjusted to provide the desired current. The current may be constant during the welding process, or may have a desired waveform of varying current. Current controlled, as used herein, is an output controlled to provide a desired current output.

Another type of welding system includes a voltage controlled power source. A voltage controlled welding power source, as used herein, is a voltage controlled power source, wherein the output voltage is monitored, and the output is adjusted to provide the desired voltage. The voltage may be constant during the welding process, or may have a desired waveform of varying voltage. Some voltage controlled welding power sources use a current command, and adjust the current in response to the monitored voltage, thereby adjusting the arc voltage by the change in current across the load.

One known welding process is a pulsed MIG process. A pulsed MIG process typically has a cyclical output having at least a peak segment with a relatively high current and a background segment with a relatively low current. A typical prior art pulsed MIG waveform is shown in FIG. 1, and includes a flat peak 101, a background 102, and steep transitions 103 and 104 between them. There is often an abrupt change in slope from at the beginning and end of the peak and background portions. Pulse welding, as used herein, includes welding with output power that is generally pulsed, at a controllable frequency, between a greater peak and a lesser background.

Undesirable arc noise is generated by the sharp edges in the waveform. Also, the sharp slope changes can cause difficulty when welding with specialty wires such as Inconel®, Monel®, and Hastelloy®, as well as aluminum, metalcore and stainless wires. For example, using such wires with prior art pulsed MIG can result in sharp edges or craters at the edges of the weld where it meets the plate. Moreover, fast slope changes from peak to background can result in arc outages at lower currents. Fast slope changes from peak to background and back to peak can cause over and under shoots of the current.

Prior art U.S. Pat. Nos. 5,742,029 and 5,001,326 discussed controlling the amount of energy in a surface tension transfer process pulse by providing an exponential decay during the tail out. However, that process also taught very rapid transitions from peak to background in other portions of the pulse. Thus, it failed to satisfactorily address arc noise.

Other prior art systems such as the Miller Pulse Star® and Summit Arc® were phase controlled systems with sinusoidal outputs that might provide less abrupt transitions, but operate at either fixed frequencies or harmonic frequencies.

One prior art patent, U.S. Pat. No. 6,909,067, used a combination of a fast current controlled ramp followed by a slower voltage controlled ramp to soften corners. This was better than the prior art, but was operative only at the beginning and end of the peak and background portions, and not during the entire transition.

Accordingly, a control scheme for pulsed MIG that provides for gradual slope changes or non-zero acceleration from peak to background and background to peak is desirable.

SUMMARY OF THE PRESENT INVENTION

According to a first aspect of the invention a method of pulse welding includes providing an output pulse waveform. The waveform has at least a frequency from a range of available frequencies not limited to harmonic frequencies. The waveform provides power suitable for welding, and has a plurality of background portions alternating with a plurality of peak portions. A transition down occurs from the peak portion to the background portion with a first acceleration and a transition up occurs from the background portion to the peak portion with a second acceleration. At least one of the first and second accelerations are non-zero over at least most of the transition.

According to a second aspect of the invention a method of pulse welding includes switching an inverter to provide a background power portion, then switching the inverter to transition up to a peak power portion, then switching the inverter to provide the peak power portion, and then switching the inverter to transition down to the background power portion. The acceleration down is non-zero over at least most of the transition down. The method is repeated a plurality of times.

According to a third aspect of the invention a system for pulse welding includes an inverter based power circuit having a control input, and a controller. The controller includes a current control module that has a control output connected to the control input and a feedback input connected to the welding output. The controller also has a peak module, a background module, a transition down module and a transition up module. The down module provides a first acceleration, and the up module provides a second acceleration. At least one of the first and second accelerations are non-zero over at least most of the transition. A timing module selectively, sequentially and repeatedly activates the peak module, the transition down module, the background module, and the transition up module.

Both of the first and second accelerations are non-zero over at least most of the transitions and/or they are equal in various embodiments.

The acceleration up has a constant magnitude and a first polarity during a first part of the transition up, and has the magnitude with the opposite polarity during a second part of the transition up, and or the acceleration down has a constant magnitude and a first polarity during a first part of the transition down, and has the magnitude with the opposite polarity during a second part of the transition down in various embodiments. The first part and second parts can combine to substantially be the entire transition.

The transitions up and/or down are current controlled in another embodiment.

The peak portion and/or background portion are current controlled in another embodiment.

The peak portion and/or background portion are voltage controlled in another embodiment.

The output waveform is created by switching an inverter in another embodiment.

One process cycle includes one transition up, one peak portion, one transition down and one background portion in that order and without further portions, in various embodiments.

The process cycle is repeated at at least a selected frequency from within a range of frequencies in some embodiments.

A timing module includes a frequency selection module capable of selecting a frequency from a range of frequency not limited to a single frequency or harmonic frequencies in another embodiment.

Other principal features and advantages of the invention will become apparent to those skilled in the art upon review of the following drawings, the detailed description and the appended claims.

Figure 1:
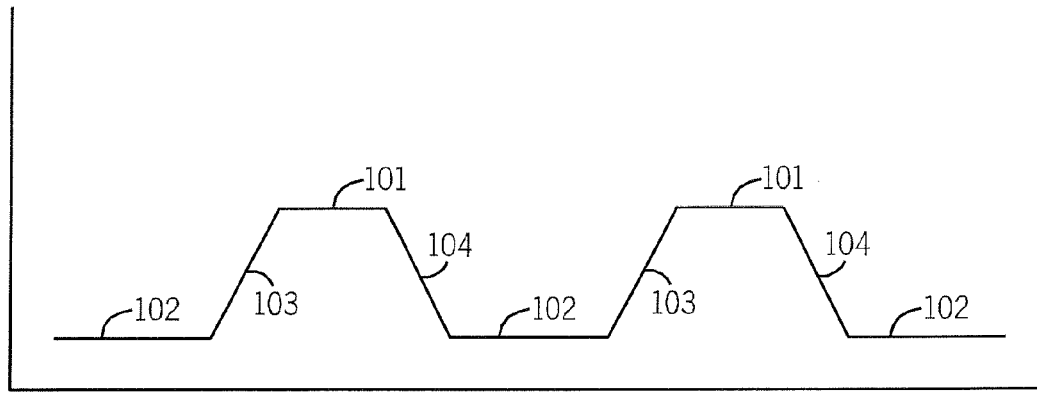
FIG. 1 is a pulsed MIG waveform according to the prior art.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular system for providing welding power, with particular components, and used for particular processes, it should be understood at the outset that the invention may also be implemented with other welding systems, processes, components, controllers, etc.

Generally, the invention provides for controlled soft pulsed MIG welding, by providing a non-zero acceleration during transitions between peak and background, preferably gradually adjusting the slope. The acceleration is non-zero during most of a transition, both transitions up and down, just up, or just down, in various embodiments. The gradual transitions need not be the same up and down or from cycle to cycle. Most of a transition, as used herein, includes more than half (magnitude based) of the transition.

Figure 7:
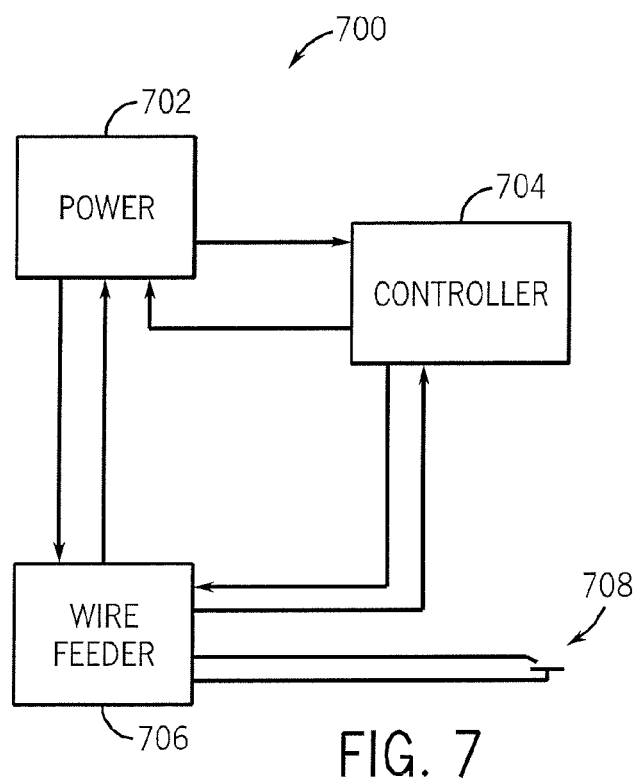
FIG. 7 is a block diagram of a welding system in accordance with the preferred embodiment.

Referring now to FIG. 7, a system for providing welding power 100 in accordance with the present invention includes a power source or circuit 702 and a wire feeder 706, that are controlled by a controller 704 to produce a welding output 708. The various components may be disposed in separate or common housings, and may be in more than one housing (a portion of controller 704 can share a housing with power source 702, while another portion share a housing with wire feeder 706).

Welding output, as used herein, includes a power output having power suitable for welding, heating or cutting. Power circuit, as used herein, includes circuitry capable of supplying welding, plasma cutting, and/or induction heating power including resonant power supplies, quasi-resonant power supplies, etc., and ancillary circuitry associated therewith. Controller, as used herein, includes digital and analog circuitry, discrete or integrated circuitry, DSPs, microprocessors, etc., and software, hardware and firmware, located on one or more boards, used to control a device such as a power supply.

The preferred embodiments provide that power source 702 is a Miller networked power source such as that described in U.S. Pat. No. 6,329,636 or U.S. Pat. No. 6,909,067, both of which are hereby incorporated by reference, and wire feeder 706 is a Miller networked wire feeder. Other wire feeders and power supplies may be used to implement the invention. Controller 704 is part of the commercially available components in the preferred embodiments.

Preferably, system 700 is a current and voltage controlled MIG power supply, includes an inverter, and has a current command and provides an output current, preferably a pulsed output (and is thus a pulsed power supply) in response thereto. It may be operated in voltage controlled mode by feeding back the output voltage and adjusting the output current to effect the desired change in output voltage. Voltage controlled, as used herein, is an output controlled to provide a desired voltage. The output voltage may be constant or varying. Inverter, as used herein, includes a power circuit that switches a dc bus to provide output power.

Controller 704 receives feedback from power circuit 702 and/or wire feeder 708, and provides control outputs to control inputs on wire feeder 708 and power circuit 702. Control input, as used herein, is an input to a circuit, such as a power circuit, that controls the output of the circuit. Control output, as used herein, is an output of a controller used to control another circuit, such as control the output of the power circuit. The feedback signals are indicative of output voltage, current functions thereof, time, or other parameters. Output voltage (or other output parameters) may be measured at the output studs, in the power supply or wire feeder, at the arc, or other places that indicate the load voltage. Controller 104 is a digital controller and implemented with software in the preferred embodiment, but may be analog, discrete, or combinations thereof.

Alternative embodiments provide that system 700 be another power supply, such as a CMT, RMD®, Accupulse®, IQ Pulse®, or AC MIG power supply and provide the corresponding output, or other welding output. CMT output, as used herein, is an output that may be used for CMT welding. AC MIG output, as used herein, is an output that may be used for AC MIG welding. CMT power source, as used herein, includes a power source that provides a CMT output. AC MIG power source, as used herein, is a power source that provides an AC MIG output.

Figure 3:
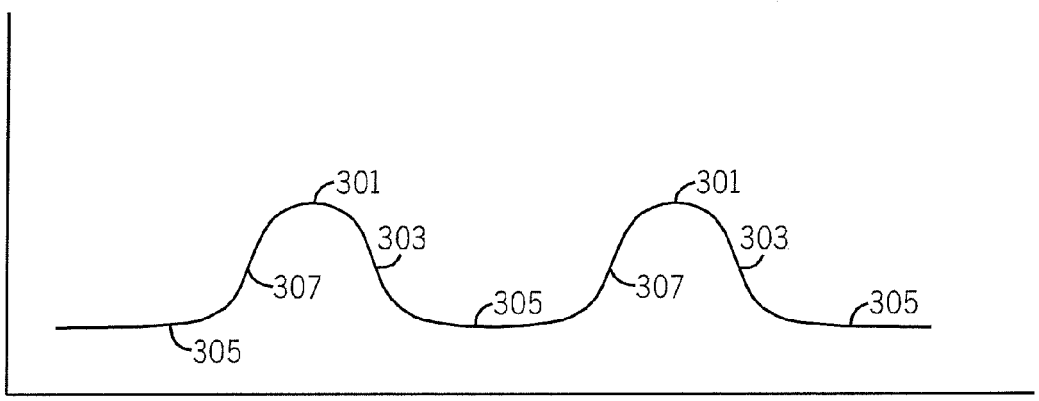
FIG. 3 is pulsed MIG waveform according to invention.

Referring now to FIG. 3, a waveform in accordance with the preferred embodiment is called an S-curve, and includes peak portions 301, transitions down 303, background portions 305, and transitions up 307. One process cycle includes one peak, one transition down, one background and one transition up. The pulse frequency is preferably between 30 hz and 200 hz, and is at at least a selected frequency within a range of frequencies. At least a frequency, as used herein, includes a constant frequency, a plurality of frequencies, or a varying frequency. Range of available frequencies, as used herein, refers to a plurality of frequencies, discrete or continuous, that a power supply can be controlled to provide. Harmonic frequencies, as used herein, includes a reference frequency and integral multiples of the reference frequency. Selected frequency, as used herein, includes a frequency selected by the user, a welding schedule, or dictated by the process.

Peak portions, as used herein, includes the portion of a pulse cycle where the output is more than the maximum less 25% of the difference between the maximum and the minimum. For example, for a pulse waveform having a maximum of 500 amps and a minimum of 100 amps the peak portion is where the output is greater than 400 amps. The peak and/or background portion preferably includes a substantially constant portion. Substantially constant, as used herein, includes a value that can be constant or vary slightly so as to not significantly affect the output.

Background portions, as used herein, includes the portion of a pulse cycle where the output is less than the minimum plus 25% of the difference between the maximum and the minimum. For example, for a pulse waveform having a maximum of 500 amps and a minimum of 100 amps the background portion is where the output is less than 200 amps.

Transition up, as used herein, includes the portion of a pulse cycle where the output increases from the background to the peak. For example, for a pulse waveform having a maximum of 500 amps and a minimum of 100 amps the transition up is where the output increases from 200 amps to 400 amps.

Transition down, as used herein, includes the portion of a pulse cycle where the output decreases from the peak to the background. For example, for a pulse waveform having a maximum of 500 amps and a minimum of 100 amps the transition down is where the output decreases from 400 amps to 200 amps.

The transitions up and down have a slope that gradually changes in the preferred embodiment. Preferably, the waveform is generated using a microprocessor, and the curve has a non-zero acceleration, preferably substantially constant, for half of the transition up, and then has the same magnitude with opposite polarity (preferably substantially constant) for the remainder of the transition up. The transitions down have the opposite polarity acceleration (preferably substantially constant) for half of the transition down, and then have the original polarity acceleration (preferably substantially constant) for the second half of the transition down. Acceleration of a curve (such as a waveform of a magnitude over time), as used herein, is the second derivative of the curve. Non-zero acceleration, as used herein, refers to the second derivative of a curve being something other than zero. Acceleration polarity refers to the sign (+/−) of the second derivative of a curve.

The curve may be generated using a simple algorithm, where, for an upward transition a new ramp rate=old ramp rate+ramp change is provided at each time increment. When the current is halfway between the peak and background, the acceleration is reversed and the new ramp rate=old ramp rate−ramp change at each time increment. The transition down (peak to background), starts with a negative acceleration so that the new ramp rate=old ramp rate−ramp change, and beginning at the halfway point the new ramp rate=old ramp rate+ramp change.

Figure 2:
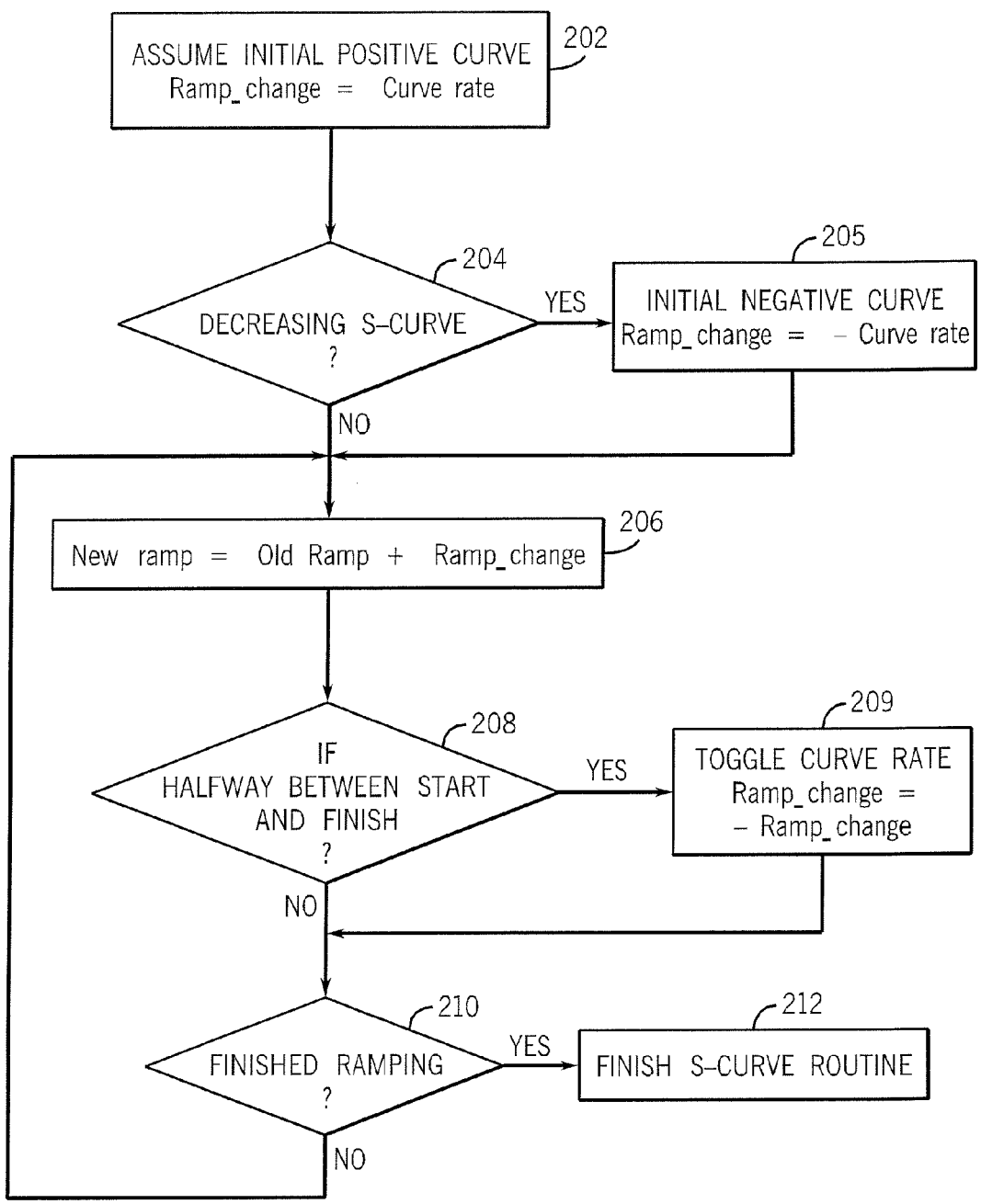
FIG. 2 is flow chart in accordance with the preferred embodiment.

The flow chart of FIG. 2 implements such an algorithm. The algorithm begins at step 202, where the initial curve is assumed to be a positive curve (i.e., a transition up) and the ramp change is set as curve rate. The preferred embodiment implements the flow chart in a microprocessor, and the curve rate is in microprocessor units. Alternative embodiments provide for the curve slope to be expressed in to be amps/msec and the acceleration to be expressed in amps/msec$^2$. At step 204 it is determined if the curve is decreasing (a transition down). If the transition is a transition down, then the ramp change is set to the −curve rate (same magnitude, opposite polarity as curve rate). At step 206 the new ramp is set equal to old ramp+ramp change.

It is determined if the curve is halfway between the beginning and end (based on current magnitude) at step 208. If the half-way point has been reached, the ramp change is set to −ramp change (same magnitude, opposite polarity). At step 210 it is determined if the ramping is ended. If the ramping has ended, the routine ends at 212. If the ramping hasn't been completed, the process returns to step 206.

The preferred embodiment provides the ramping for the entire range between the minimum and maximum, but other embodiments provide the ramping for lesser portions, such as part of the transitions up and down. One example of the preferred embodiment uses a minimum of 100 amps, a maximum of 500 amps, the acceleration (curve rate) is 300 amps/sec$^2$, and the time for one loop through the flow chart is 50 microsec.

In the preferred embodiment the transitions are current controlled and the peak and background are voltage controlled. In other embodiments the peak, background and transition are voltage or current controlled in any combination.

Figure 4:
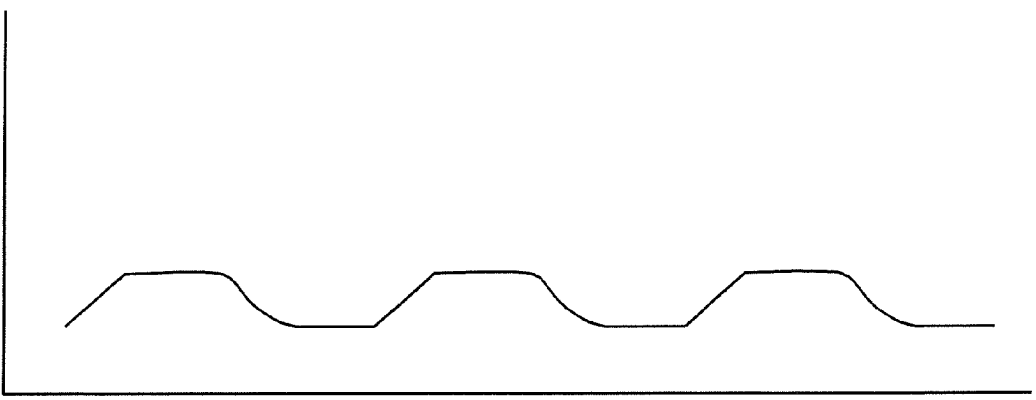
FIG. 4 is pulsed MIG waveform according to invention.
Figure 5:
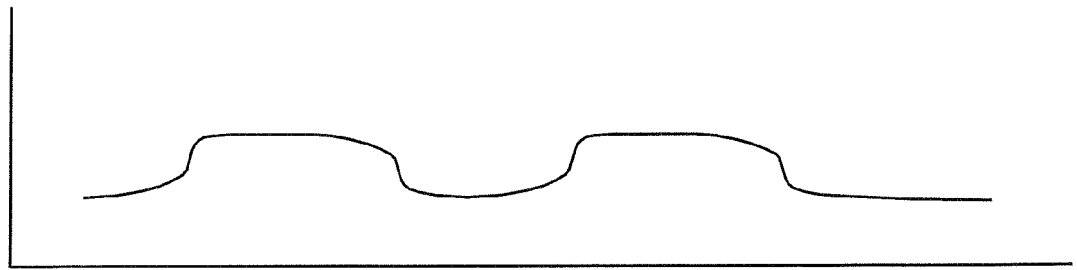
FIG. 5 is pulsed MIG waveform according to invention.
Figure 6:
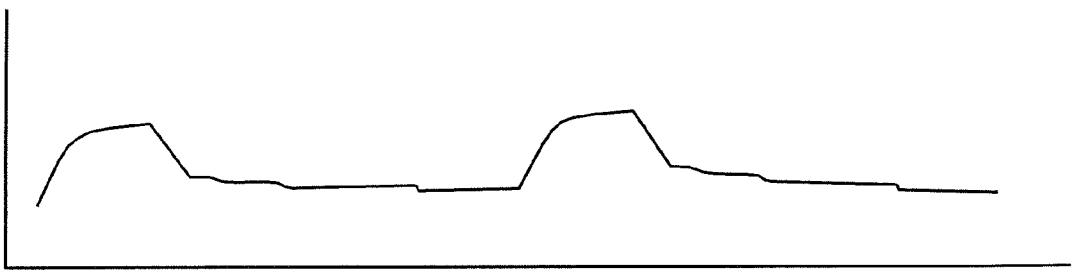
FIG. 6 is pulsed MIG waveform according to invention.

Alternatives provide for other transitions such as those shown in FIGS. 4, 5, and 6, and includes combining the above S-curve (or other curves) with a linear ramp, using a mathematical quadratic equation, a predefined or computed wave shape, a sinusoid, using the S-curve (or other curve) on the transition up and a linear ramp on the transition down (or the reverse), toggling the polarity of the acceleration at a point other than half-way, and using different magnitudes along with opposite polarity accelerations, or combining these alternatives.

Figure 8:
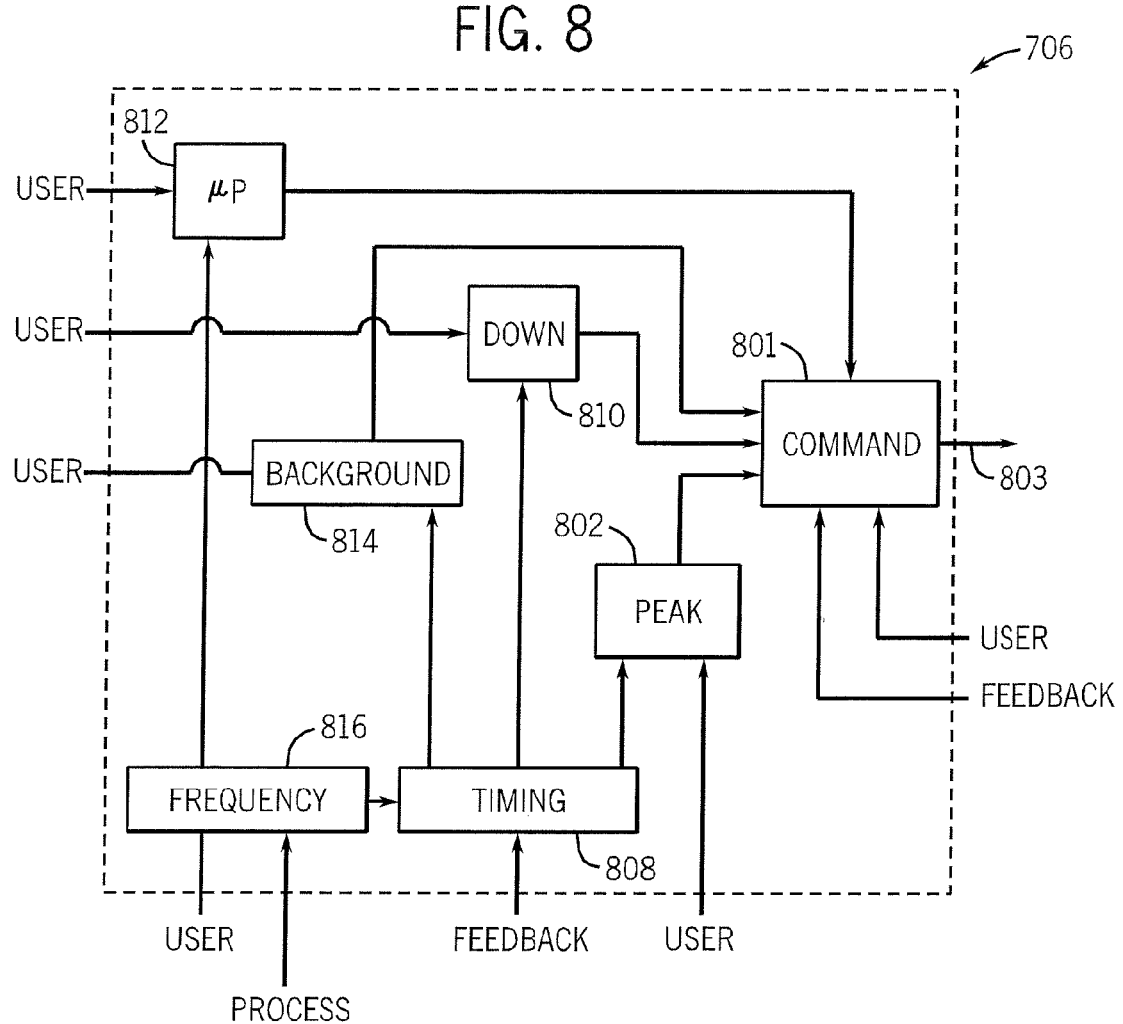
FIG. 8 is a block diagram of a portion controller in accordance with the preferred embodiment.

Referring now to FIG. 8, a portion of controller 704 that creates the output waveform of FIGS. 3-6 (or other desired waveforms) is shown and includes a command output module 801 that provides a control output 803 in response to signals from a peak module 802, a timing module 808, a transition down module 810, a transition up module 812, a background module, 814 and a frequency selection module 816. Each module can receive feedback and/or a setpoint, or that information can be received only be the command module. The setpoint information (which includes single values and waveforms) determines the desired curve magnitudes, and/or slopes, and can be process, factory, or user selected. Not all modules are used in every embodiment. For example, transition down module may be omitted and a ramp with a constant slope down may be used, or frequency selection module 816 may be omitted. Also, other modules may be included. Generally, the invention includes using control modules used to provide the desired output, and they may be "mixed and matched" as desired. Module, as used herein, includes software and/or hardware, digital or analog, that cooperate to perform one or more control tasks, and can include digital commands, power circuitry, networking hardware, etc.

Command output module 801 may be a current control module and/or a voltage control module. The preferred embodiment provides for command module 801 to include a current control module active during transitions, and a voltage control module active during peak and background portions. Both, or only one, are active in various embodiments. Command module 801 preferably includes a PI loop, or other control loop. Command output module, as used herein, includes a module that provides a control output in response to timing, and/or feedback, and/or other modules, and/or setpoints. Current control module, as used herein, is a module that controls to provide a desired current output. The output current may be constant or varying. Voltage control module, as used herein, is a module that controls to provide a desired voltage output. The output voltage may be constant or varying.

Peak module 802 provides a signal to module 801 that sets the desired current or voltage during the peak portion. Peak module, as used herein, is a module that controls to provide a peak portion of pulse output. Peak module 802 is activated by timing module 808. Timing module, as used herein, includes a module that controls the output in response to lapsed time, or in response to a combination of lapsed time and feedback. Activate a module, as used herein, refers to using a module in the control scheme. The peak portion is preferably commanded to be flat or consistent with the waveforms shown herein, or with other desired waveforms.

Timing module 808 determines when the peak portion ends and the transition down begins, preferably based on time and/or process feedback. To end the peak portion timing module 808 deactivates peak module 802 and activates transition down module 810. Transition down module provides the desired transition down curve, such as with flowchart 200. It preferably includes the algorithm where the current slope is equal to an old slope plus the acceleration. For example, if the peak is 500, and acceleration −1 for each time increment, then the current would go from 500 to 499 in one time increment, and then to 497, to 494, to 490, to 485, etc in subsequent time increments. That continues until the half-way point (300, for a background of 100, e.g.). After 20 time increments the current would be less than 300, and the acceleration polarity is reversed. For example, if, during the 20$^{th}$ increment, the current decreased from 310 to 290, it would decrease to 271 in the next increment, and then to 253, 236, 220, etc in subsequent increments, until it reached the background level of 100. This example uses using amps and relatively lengthy time increments, but the preferred routine is done in nominal microprocessor units, which translate to a command signal and using hundreds or thousands of increments per process cycle. Transition down module, as used herein, includes a module that controls the output to provide a transition down.

When timing circuit 808 determines that the transition down has ended, preferably based on feedback (a failsafe timeout can also be provided), background module 814 is activated, and transition down module 810 is deactivated. Background module 814 provides the shape of the background portion, preferably generally flat, or another desired profile. Background module, as used herein, is a module that controls to provide a background current.

When timing circuit 808 determines that the background has ended, preferably based on timing and/or feedback background module 814 is deactivated, and transition up module 812 is deactivated. Transition up module 812 operates similar to transition down module, but in reverse, in the preferred embodiment. For example, going from 100 to 500, with an acceleration of 1, the current would change from 100, to 101, to 103, to 106, to 110, to 115, etc. At the half-way point the current increase would begin to reduce, until the endpoint is reached. Of course, other curves with non-zero acceleration could be provided. Transition up module, as used herein, includes a module that controls the output to provide a transition up.

Frequency selection module 816 selects (from the user, process or factory settings) the pulse frequency and duration of the portions of the pulses as desired. It provides an input to timing module 808, which selectively, sequentially and repeatedly activates the various modules as set forth above. Selectively, sequentially and repeatedly activating modules means activating modules one at time, and one after the other, and in the same order, and doing so plurality of times. Frequency selection module, as used herein, includes is a module that controls the frequency of an output.

Numerous modifications may be made to the present invention which still fall within the intended scope hereof. Thus, it should be apparent that there has been provided in accordance with the present invention a method and apparatus for pulse welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of pulse welding, comprising providing an output waveform having at least a frequency from a range of available frequencies not limited to harmonic frequencies and having a power suitable for welding, wherein the waveform comprises a plurality of background portions alternating with a plurality of peak portions, wherein a transition down occurs from the peak portion to the background portion with a first acceleration and further wherein a transition up occurs from the background portion to the peak portion with a second acceleration, wherein at least one of the first acceleration is non-zero over at least most of the transition down and the second acceleration is non-zero over at least most of the transition up.

2. The method of claim 1, wherein both of the first acceleration is non-zero over at least most of the transition down and the second acceleration is non-zero over at least most of the transition up.

3. The method of claim 1, wherein the first acceleration is substantially constant over a first part of the transition down, and has a first magnitude and a first polarity.

4. The method of claim 1, wherein the transition up and the transition down are current controlled.

5. The method of claim 1, wherein at least one of the peak portion and background portion is current controlled.

6. The method of claim 1, wherein at least one of the peak portion and background portion is voltage controlled.

7. The method of claim 1, wherein providing an output waveform further comprises switching an inverter.

8. The method of claim 1, wherein providing an output waveform further comprises providing a waveform with a process cycle having one transition up, one peak portion, one transition down and one background portion in that order and without further portions.

9. The method of claim 3, wherein the first acceleration is substantially constant over a second part of the transition down, and has a second magnitude and a second polarity, wherein the first magnitude is substantially equal to the second magnitude, and the second polarity is opposite the first polarity, and wherein the first part and second parts combine to substantially be the entire transition down.

10. A method of pulse welding, comprising
switching an inverter to provide a background power portion;

then switching the inverter to transition up to a peak power portion;

then switching the inverter to provide the peak power portion;

then switching the inverter to transition down to the background power portion with an acceleration down that is non-zero over at least most of the transition down; and repeating the above a plurality of times.

11. The method of claim 10, wherein switching the inverter to transition up includes switching the inverter to transition up with an acceleration up that is non-zero over at least most of the transition up.

12. The method of claim 10, wherein the repeating is performed at at least a selected frequency from within a range of frequencies.

13. The method of claim 10, wherein switching the inverter to transition down includes switching the inverter to transition down with an acceleration up that is non-zero over at least most of the transition down.

14. The method of claim 11, wherein:
the acceleration up is substantially constant over a first part of the transition up, and has a first magnitude and a first polarity;
the acceleration up is substantially constant over a second part of the transition up, and has a second magnitude and a second polarity, wherein the first magnitude is substantially equal to the second magnitude, and the second polarity is opposite the first polarity, and wherein the first part of the transition up and the second part of the transition up combine to substantially be the entire transition up;
the acceleration down is substantially constant over a first part of the transition down, and has the second magnitude and second polarity; and
the acceleration down is substantially constant over a second part of the transition down, and has the first magnitude and the first polarity, and wherein the first part of the transition down and the second part of the transition down combine to substantially be the entire transition down.

15. A system for pulse welding, comprising:
an inverter based power circuit having a control input; and
a controller, including a current control module, having a control output connected to the control input and a feedback input connected to the welding output, wherein the controller includes a peak module, a background module, a transition down module that provides a first acceleration, a transition up module having a second acceleration, wherein at least one of the first acceleration is non-zero over at least most of the transition down and the second acceleration is non-zero over at least most of the transition up, and a timing module to selectively, sequentially and repeatedly activate the peak module, the transition down module, the background module, and the transition up module.

16. The system of claim 15, wherein one of the first acceleration is non-zero over at least most of the transition down up and the second acceleration is non-zero over at least most of the transition up.

17. The system of claim 15, wherein the second acceleration is substantially constant over a second part of the transition, and has the first magnitude and a second polarity, wherein the second polarity is opposite the first polarity, and wherein the first part and second parts combine to substantially be the entire transition.

18. The system of claim 15, wherein the timing module includes a frequency selection module capable of selecting a frequency from a range of frequency not limited to a single frequency or harmonic frequencies.

19. The system of claim 16, wherein the second acceleration is substantially constant over a first part of the transition up, and has a first magnitude and a first polarity.

20. The system of claim 17, wherein the first acceleration is substantially constant over a third part of the transition down, and has the first magnitude and the second polarity, and further wherein the first acceleration is substantially constant over a fourth part of the transition down, and has the first magnitude and the first polarity, and wherein the first part and second parts combine to substantially be the entire transition.

21. The system of claim 20, wherein at least one of the peak module and background module includes a voltage control module.

22. The system of claim 21, wherein at least one of the peak module, the background module, the transition up module and the transition down module include a current control module.

* * * * *